United States Patent
Ito et al.

(10) Patent No.: US 6,808,549 B2
(45) Date of Patent: Oct. 26, 2004

(54) HYDROGEN ABSORPTION ALLOY ELECTRODE

(75) Inventors: Shinichiro Ito, Kosai (JP); Hajime Seri, Izumiotsu (JP); Kojiro Ito, Kosai (JP); Shinichi Yuasa, Kyotanabe (JP); Nobuyasu Morishita, Toyohashi (JP)

(73) Assignees: Matsushita Electric Industrial Co., Ltd, Osaka (JP); Toyota Jidosha Kabushiki Kaisha, Aichi (JP)

(*) Notice: Subject to any disclaimer, the term of this patent is extended or adjusted under 35 U.S.C. 154(b) by 49 days.

(21) Appl. No.: 10/145,700

(22) Filed: May 16, 2002

(65) Prior Publication Data

US 2003/0005982 A1 Jan. 9, 2003

(30) Foreign Application Priority Data

May 17, 2001 (JP) .......................... 2001-147596

(51) Int. Cl.$^7$ .............................................. C22C 19/03
(52) U.S. Cl. ............................................ 75/245
(58) Field of Search ........................... 75/245; 429/209

(56) References Cited

U.S. PATENT DOCUMENTS

| | | | |
|---|---|---|---|
| 4,877,508 A | * 10/1989 | Morimoto et al. ......... | 204/290 |
| 5,536,591 A | 7/1996 | Fetcenko et al. ........... | 429/59 |
| 5,837,317 A | 11/1998 | Moriwaki et al. | |
| 6,040,087 A | 3/2000 | Kawakami ............... | 429/218.1 |
| 6,048,644 A | 4/2000 | Tsuji et al. .............. | 429/218.2 |
| 6,309,779 B1 | 10/2001 | Tsuji et al. .............. | 429/218.2 |

FOREIGN PATENT DOCUMENTS

| | | |
|---|---|---|
| EP | 0793284 | 9/1997 |
| EP | 0851515 | 7/1998 |
| EP | 0867956 | 9/1998 |
| EP | 1030392 | 8/2000 |
| JP | 4-137361 | 5/1992 |

OTHER PUBLICATIONS

English Language Abstract of JP 4–137361.

* cited by examiner

*Primary Examiner*—Ngoclan T. Mai
(74) *Attorney, Agent, or Firm*—Greenblum & Bernstein, P.L.C.

(57) ABSTRACT

A negative electrode of a battery, chiefly includes hydrogen absorption alloy particles each having a surface layer. The alloy particles satisfy $R2/R1 \geq 0.004$ and $5 \,\mu m \leq R1 \leq 20 \,\mu m$, or preferably $5 \,\mu m \leq R1 \leq 12.5 \,\mu m$, where R1 is a half of a median diameter of the particles and R2 is thickness of the surface layers.

3 Claims, 6 Drawing Sheets

HYDROGEN ABSORPTION ALLOY ELECTRODE

The present disclosure relates to subject matter contained in priority Japanese Patent Application No. 2001-147596, filed on May 17, 2001, the contents of which is herein expressly incorporated by reference in its entirety.

BACKGROUND OF THE INVENTION

1. Field of the Invention

The present invention relates to a hydrogen absorption alloy electrode to be used as a negative electrode of a nickel-metal hydride rechargeable battery.

2. Description of Related Art

Hydrogen absorption alloys, capable of absorbing and releasing hydrogen at and near normal temperatures and pressures, are used as the materials of negative electrodes in nickel-metal hydride rechargeable batteries. Nickel-metal hydride rechargeable batteries are high in energy density as compared to nickel-cadmium rechargeable batteries and lead batteries, and have received attention for their cleanness because of containing no toxic element.

Hydrogen absorption alloy electrodes are made of hydrogen absorption alloy particles, which are produced by crushing alloy ingots coarsely, followed by mechanical grinding in an attritor or the like so that the particles have a predetermined median diameter of, e.g., 50 $\mu$m or so.

The hydrogen absorption alloys form oxide layers easily upon exposure to air. These oxide layers inhibit the absorption and release of hydrogen, thereby yielding the problem that high rate charge-discharge characteristics cannot be obtained in initial charge-discharge cycles. For improved alloy activity, there have been disclosed techniques of forming metal layers of nickel on the surfaces of the alloy particles as a hydrogen dissociation catalyst layer. An example thereof appears in Japanese Patent Laid-Open Publication No. Hei 4-137361. Specifically, the technique includes a method of treating hydrogen absorption alloys in a hot alkali solution.

Although given the nickel metal layers on their surfaces as mentioned above, the conventional hydrogen absorption alloys are greater in average particle size and relatively smaller in the surface layer thickness with respect to particle diameters. This means smaller Ni content on the surfaces of the alloy particles, smaller specific surface area per gram of alloy, and smaller surface area per electrode area of 1 cm$^2$×thickness of 1 mm. Besides, the surface layers of the alloy particles contain less metal Ni, or are smaller in the content of metal Ni per electrode area of 1 cm$^2$×thickness of 1 mm. This causes problems of lower activity, higher internal resistance, and poor initial battery characteristics in initial cycles.

Under the circumstances, the internal resistance has been lowered to operable values by repeating low-current charge and discharge a plurality of times on shipment for the sake of initial activation. As shown in FIG. 1, this repetition of charge-discharge cycles gradually lowers the internal resistance. Nevertheless, it takes long for a predetermined internal resistance to be reached, causing a problem of deteriorated productivity.

SUMMARY OF THE INVENTION

In light of the conventional problems mentioned above, an object of the present invention is to provide a hydrogen absorption alloy electrode which has high activity in initial, charge-discharge cycles.

A hydrogen absorption alloy electrode according to the present invention chiefly includes hydrogen absorption alloy particles each having a surface layer which mainly includes Ni metal. The alloy particles satisfy R2/R1≧0.004 and 5 $\mu$m≦R1≦20 $\mu$m, where R1 is a half of a median diameter of the particles and R2 is thickness of the surface layers. The yet preferable range of R1 is 5 $\mu$m≦R1≦12.5 $\mu$m.

Consequently, the alloy particles are confined to a range of smaller particle sizes with an increase in the total surface area. Besides, the surface layers, which contain large amounts of Ni metal, are given a greater relative thickness. The result is that the surface content of Ni metal increases sufficiently. Thus, as shown in FIG. 1, the initial activation time necessary to lower the internal resistance to operable values is made shorter than heretofore, with an improvement in productivity.

Here, R1 of alloy particles 1, which have various shapes as shown in FIG. 2A, refers to the median of radii of alloy particles 1a. The alloy particles 1a are spheres having the same volumes or circles having the same cross-sectional areas which are assumed from the respective alloy particles 1. Surface layers 3 are ones different from bulk layers 2 in composition or texture, being formed by immersing alloy particles in a hot alkali aqueous solution so that misch metals, Co, Al, and Mn dissolve from the surfaces of the hydrogen absorption alloys. The surface layers 3 contain Ni metal, along with misch metal hydroxides and oxides.

The internal resistance is further lowered to shorten the initial activation time by rendering the alloy particles greater than or equal to 0.5 m$^2$/g in specific surface area, the surface area greater than or equal to 0.28 m$^2$ per electrode area of 1 cm$^2$×thickness of 1 mm, the surface layers of the alloy particles greater than or equal to 1.5% by weight in the content of metal Ni, and the surface layers of the alloy particles greater than or equal to 8×10$^{-3}$ g in the content of metal Ni per electrode area of 1 cm$^2$×thickness of 1 mm.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENT

Figure 1:
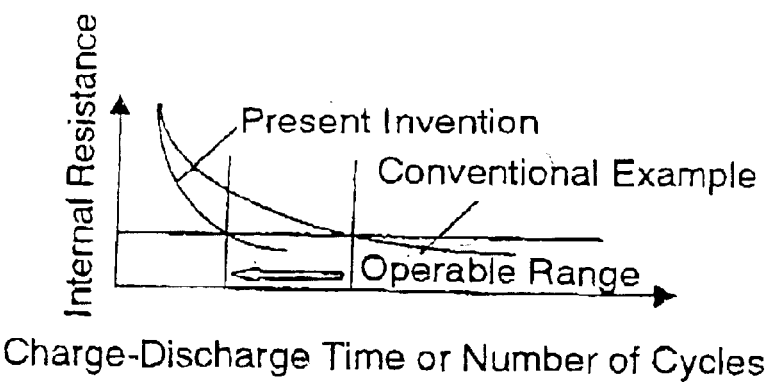
FIG. 1 is a graph showing variations in internal resistance of a hydrogen absorption alloy electrode of the present invention and of a conventional example due to charge-discharge cycles.
Figure 2A:
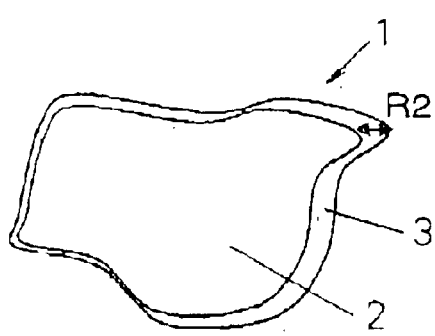
FIGS. 2A and 2B are explanatory diagrams showing the actual shape of a hydrogen absorption alloy particle, a median diameter, and the thickness of a surface layer.
Figure 2B:
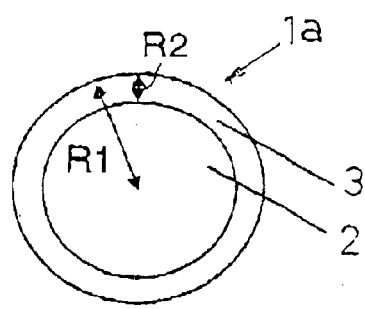

Hereinafter, an embodiment of the hydrogen absorption alloy electrode of the present invention will be described with reference to FIGS. 3 to 7.

The hydrogen absorption alloy electrode of the present invention uses hydrogen absorption alloys which are of no limited composition in particular. In the present embodiment, hydrogen absorption alloy powders of misch metal $Ni_{3.5}Co_{0.7}Mn_{0.4}Al_{0.3}$, containing 45% by weight of Ce, 30% by weight of La, 5% by weight of Nd, and 20% by weight of other rare-earth elements, were used.

These hydrogen absorption alloy powders were prepared in the following way. Initially, the misch metal and other metal materials were put into an arc melting furnace in ratios corresponding to the foregoing alloy composition. Under a reduced pressure of 0.0133 to 0.00133 Pa ($10^{-4}$ to $10^{-5}$ Torr), the materials were heated to melt in an argon gas atmosphere by means of arc discharge. The resultant was subjected to further heat treatment in the argon gas atmosphere at 1050° C. for eight hours, and cooled into an alloy. Next, this alloy was coarsely crushed and then ground in a ball mill to or below various particle sizes, so that hydrogen absorption alloy powders of 10, 25, 32, and 40 μm in median diameter (2×R1) were made. The method of measuring a median diameter of the alloy powders is not limited to particular one. For example, laser diffraction scattering method may be employed.

Subsequently, these hydrogen absorption alloy powders were immersed in a 90° C.-heated KOH aqueous solution of 1.3 in specific gravity for different periods (30, 60, and 90 minutes) before rinsed with water and dried for surface modification (the formation of the surface layers 3). A thickness of the surface layers can be measured by transmission electron microcopy, although the method of measuring is not limited to particular one.

With respect to 100 parts by weight of each hydrogen absorption alloy powder modified, 0.15 parts by weight of carboxymethyl cellulose, 0.3 parts by weight of carbon black, and 0.7 parts by weight of styrene-butadiene copolymer were added. The resultants were kneaded with water into pastes.

These pastes were applied to punched metals in thicknesses of 260, 300, and 400 μm. After dried, the articles were pressed in a roll press and then cut into negative electrodes of predetermined size.

These negative electrodes were combined with positive electrodes and separators to fabricate 6.5-Ah prismatic cells. Here, the positive electrodes were foamed nickel plates filled with an active material chiefly including nickel hydroxide. The separators were made of polypropylene nonwoven fabric sulfonated.

Samples A–L fabricated as described above were measured for physical data including R1 (μm), R2 (μm), surface area ($m^2$/g), R2/R1, and the surface content of metal Ni (wt %), and the internal resistance (mΩ) after 10 cycles of initial activation. Table 1 shows the measurements.

TABLE 1

| Sample | A | B | C | D | E | F | G | H | I | J | K | L |
|---|---|---|---|---|---|---|---|---|---|---|---|---|
| Median diameter (μm) | 10 | 10 | 10 | 25 | 25 | 25 | 32 | 32 | 32 | 40 | 40 | 40 |
| R1 (μm) | 5 | 5 | 5 | 12.5 | 12.5 | 12.5 | 16 | 16 | 16 | 20 | 20 | 20 |
| Immersion period (min.) | 30 | 60 | 90 | 30 | 60 | 90 | 30 | 60 | 90 | 30 | 60 | 90 |
| R2 (μm) | 0.02 | 0.04 | 0.05 | 0.02 | 0.05 | 0.07 | 0.02 | 0.06 | 0.08 | 0.02 | 0.07 | 0.08 |
| Surface area ($m^2$/g) | 1.25 | 1.30 | 1.33 | 0.50 | 0.52 | 0.53 | 0.41 | 0.39 | 0.41 | 0.33 | 0.33 | 0.33 |
| R2/R1 | 0.004 | 0.006 | 0.010 | 0.002 | 0.004 | 0.005 | 0.002 | 0.004 | 0.005 | 0.001 | 0.004 | 0.004 |
| Surface content of metal Ni (wt %) | 3.0 | 3.4 | 3.7 | 1.2 | 1.3 | 1.5 | 0.9 | 1.0 | 1.2 | 0.8 | 0.8 | 0.9 |
| Internal resistance (mΩ) | 5.0 | 4.2 | 3.9 | 6.8 | 5.2 | 5.1 | 7.5 | 5.5 | 5.3 | 7.7 | 5.5 | 5.5 |

For the sample F, hydrogen absorption alloy pastes applied in thicknesses of 260, 300, and 400 μm were pressed into samples F-1 to F-6 of different thicknesses. These samples F-1 to F-6 were measured for the specific surface area ($m^2$/mm) per 1-mm-thick alloy portion in a 1-$cm^2$ area of negative electrode, the content of metal Ni (g/mm) per 1-mm-thick alloy portion in a 1-$cm^2$ area of negative electrode, and the internal resistance (mΩ). Table 2 shows the measurements, along with the specific surface area ($m^2$/g) and the content of metal Ni (wt %) of the alloy shown in Table 1.

TABLE 2

| Sample | F-1 | F-2 | F-3 | F-4 | F-5 | F-6 |
|---|---|---|---|---|---|---|
| Application thickness (μm) | 260 | 260 | 300 | 300 | 400 | 400 |

TABLE 2-continued

| Sample | F-1 | F-2 | F-3 | F-4 | F-5 | F-6 |
|---|---|---|---|---|---|---|
| Post-press thickness ($\mu$m) | 211 | 190 | 244 | 219 | 320 | 288 |
| Specific surface area of alloy ($m^2/g$) | 0.53 | 0.53 | 0.53 | 0.53 | 0.53 | 0.53 |
| Specific surface area of negative electrode ($m^2/mm$)* | 0.39 | 0.44 | 0.34 | 0.38 | 0.26 | 0.28 |
| Content of metal Ni in alloy (wt %) | 1.5 | 1.5 | 1.5 | 1.5 | 1.5 | 1.5 |
| Content of metal Ni in negative electrode(g/mm)* | 0.0110 | 0.0122 | 0.0095 | 0.0106 | 0.0073 | 0.0081 |
| Internal resistance (m$\Omega$) | 4.4 | 4.0 | 5.1 | 4.1 | 7.5 | 5.4 |
| Remarks | | | Table1-F | | | |

*per thickness of 1 mm (1 mm × 1 cm × 1 cm)

Figure 3:
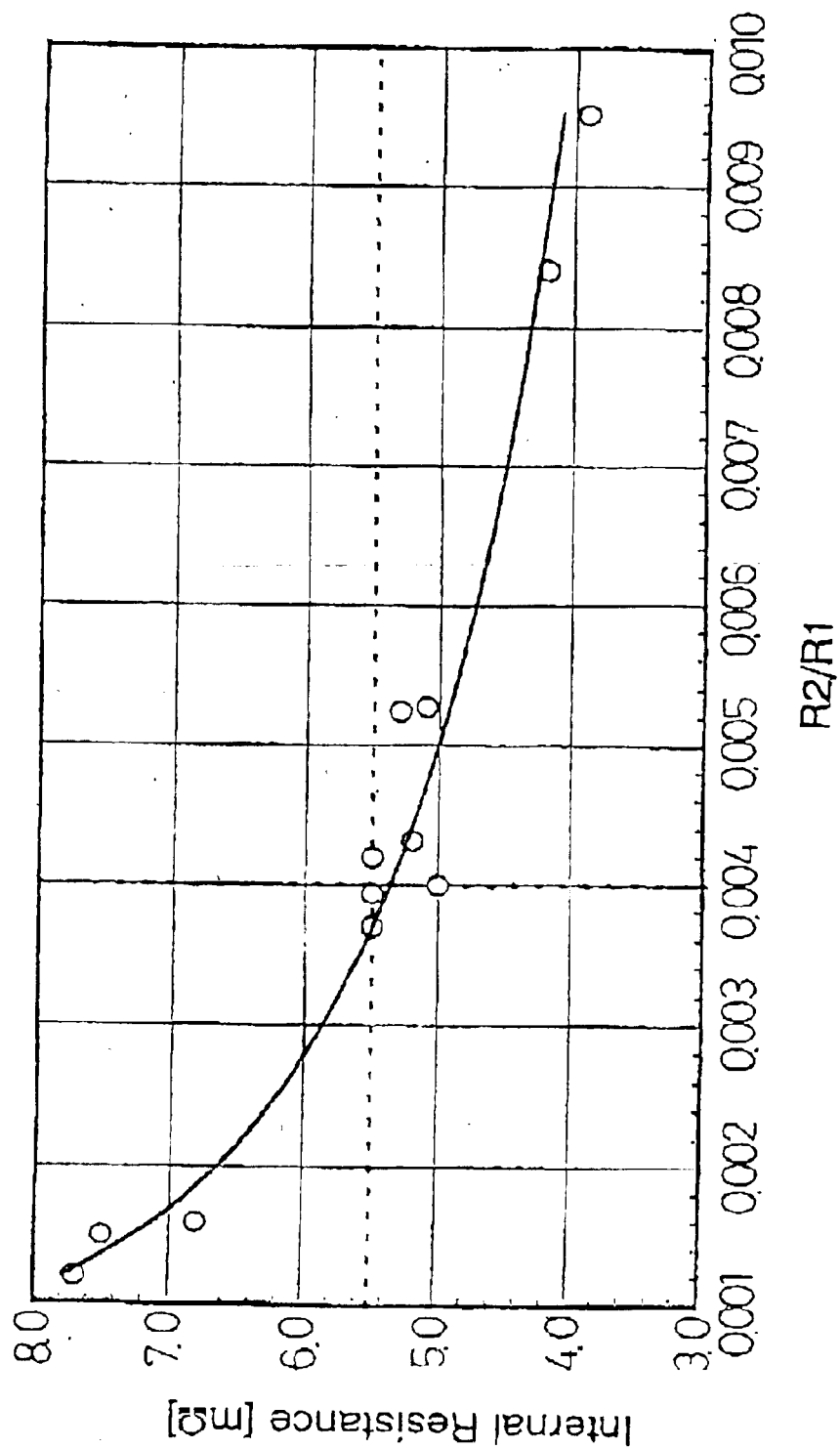
FIG. 3 is a graph showing the correlation between R2/R1 and the internal resistance of hydrogen absorption alloy electrodes according to an embodiment of the invention.

Now, analyses will be given with reference to FIGS. 3 to 7, in which the foregoing measurements are plotted. FIG. 3 shows the correlation between R2/R1 and the internal resistance. The smaller R2/R1 is, the higher the internal resistance becomes. The greater R2/R1, the lower the internal resistance. At R2/R1 of 0.004 and greater, the internal resistance is controlled to 5.5 m$\Omega$ or below. This allows a reduction in the initial activation time, thereby improving productivity. Note that when R1 reaches or exceeds 20 $\mu$m, R2/R1$\geq$0.004 is unattainable even by extended periods of surface modification.

Figure 4:
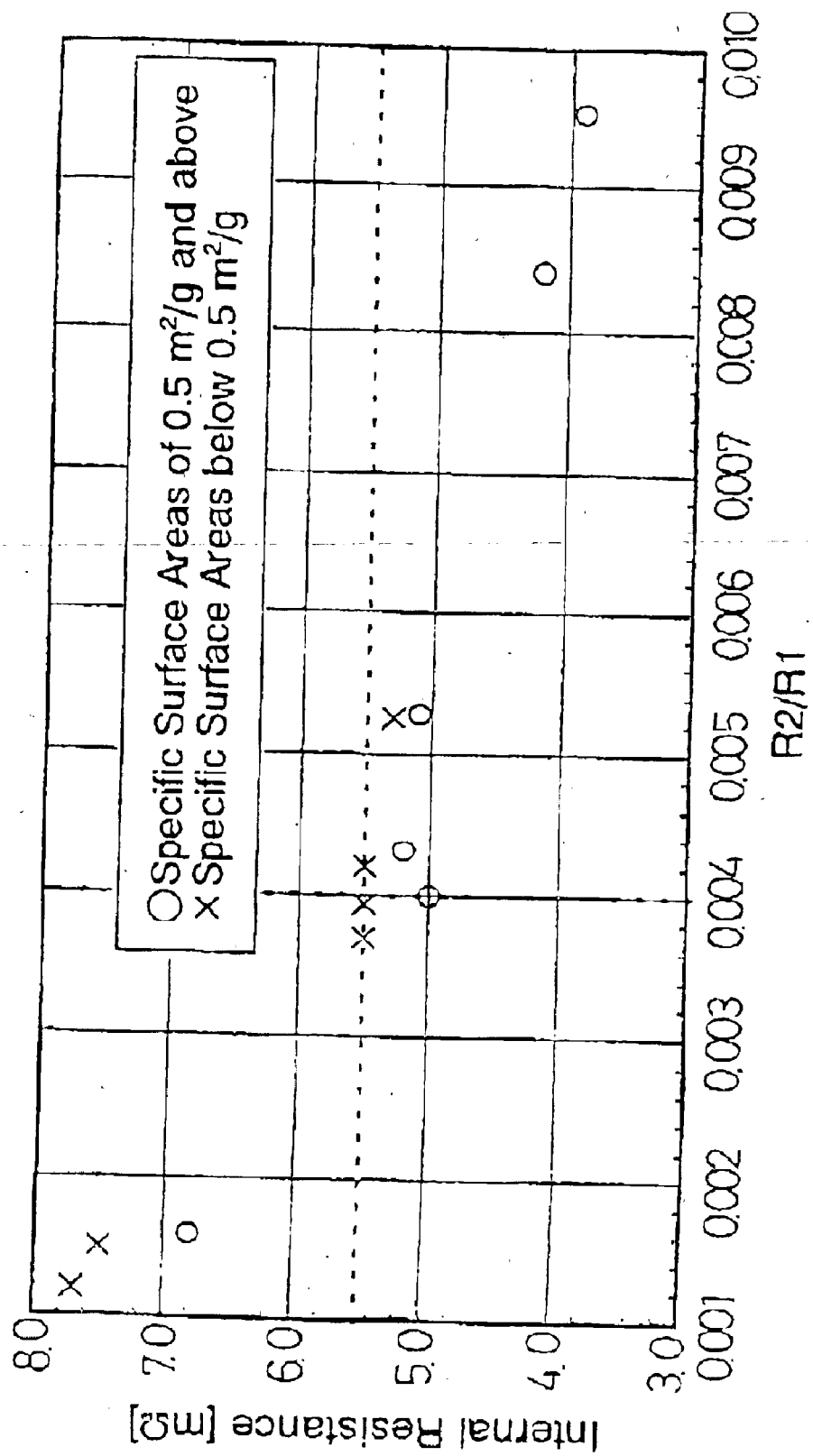
FIG. 4 is a graph showing the correlation among R2/R1, the specific surface area, and the internal resistance of the hydrogen absorption alloy electrodes according to the embodiment.

FIG. 4 shows the case where the specific surface areas of the alloys are taken into account as an additional parameter. Where R2/R1$\geq$0.004 and the specific surface area reaches or exceeds 0.5 $m^2/g$, the internal resistance is stably reduced to or below 5.5 m$\Omega$.

Figure 5:
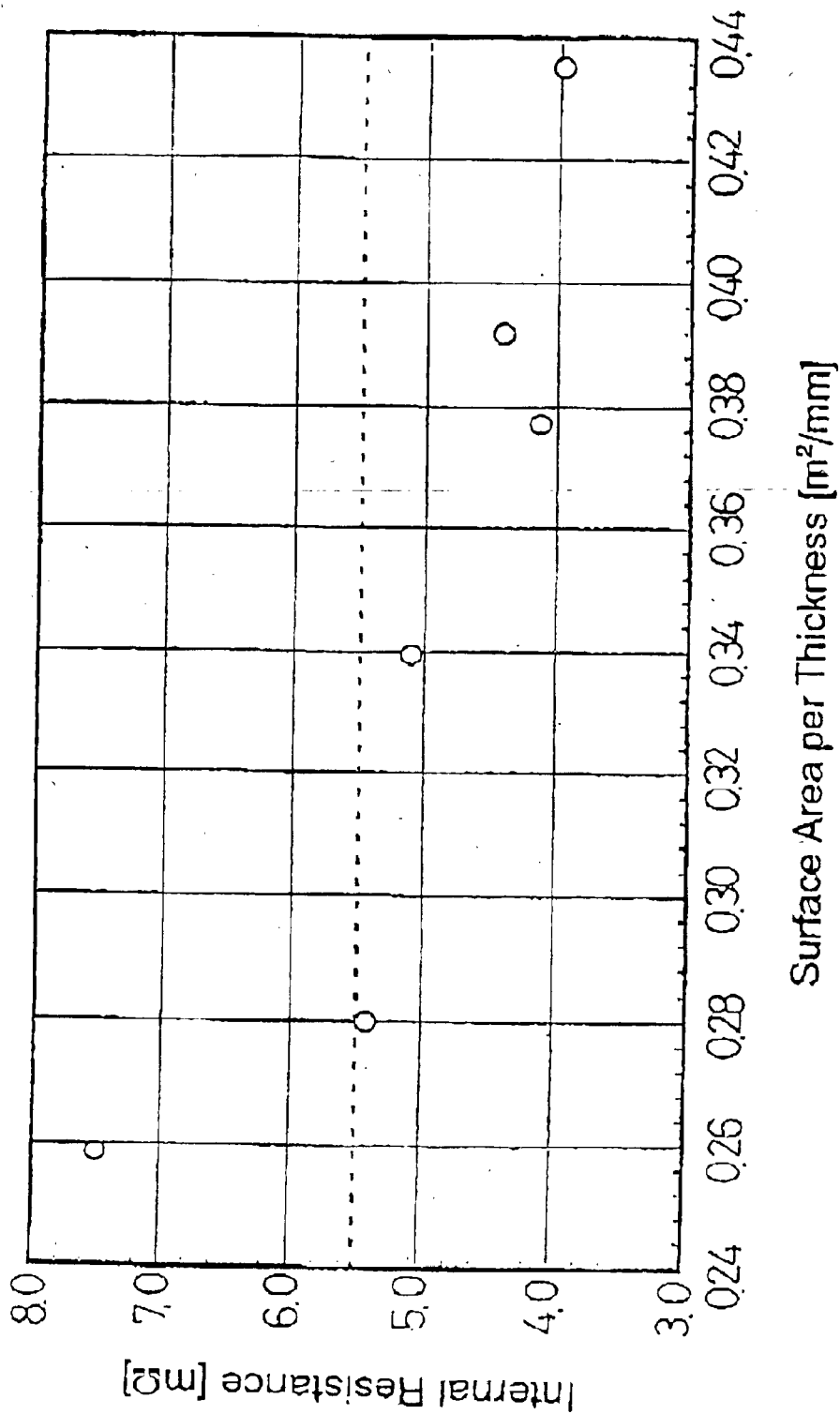
FIG. 5 is a graph showing the correlation between the per-thickness surface area and the internal resistance of the hydrogen absorption alloy electrodes according to the embodiment.

FIG. 5 shows the correlation between the specific surface area ($m^2/mm$) per 1-mm-thick alloy portion in a 1-$cm^2$ area of negative electrode and the internal resistance. The internal resistance increases sharply when the amount of pressing is smaller and the specific surface area per thickness of 1 mm falls below 0.28 $m^2/mm$. At 0.28 $m^2/mm$ and above, the internal resistance is controlled to 5.5 m$\Omega$ or below.

Figure 6:
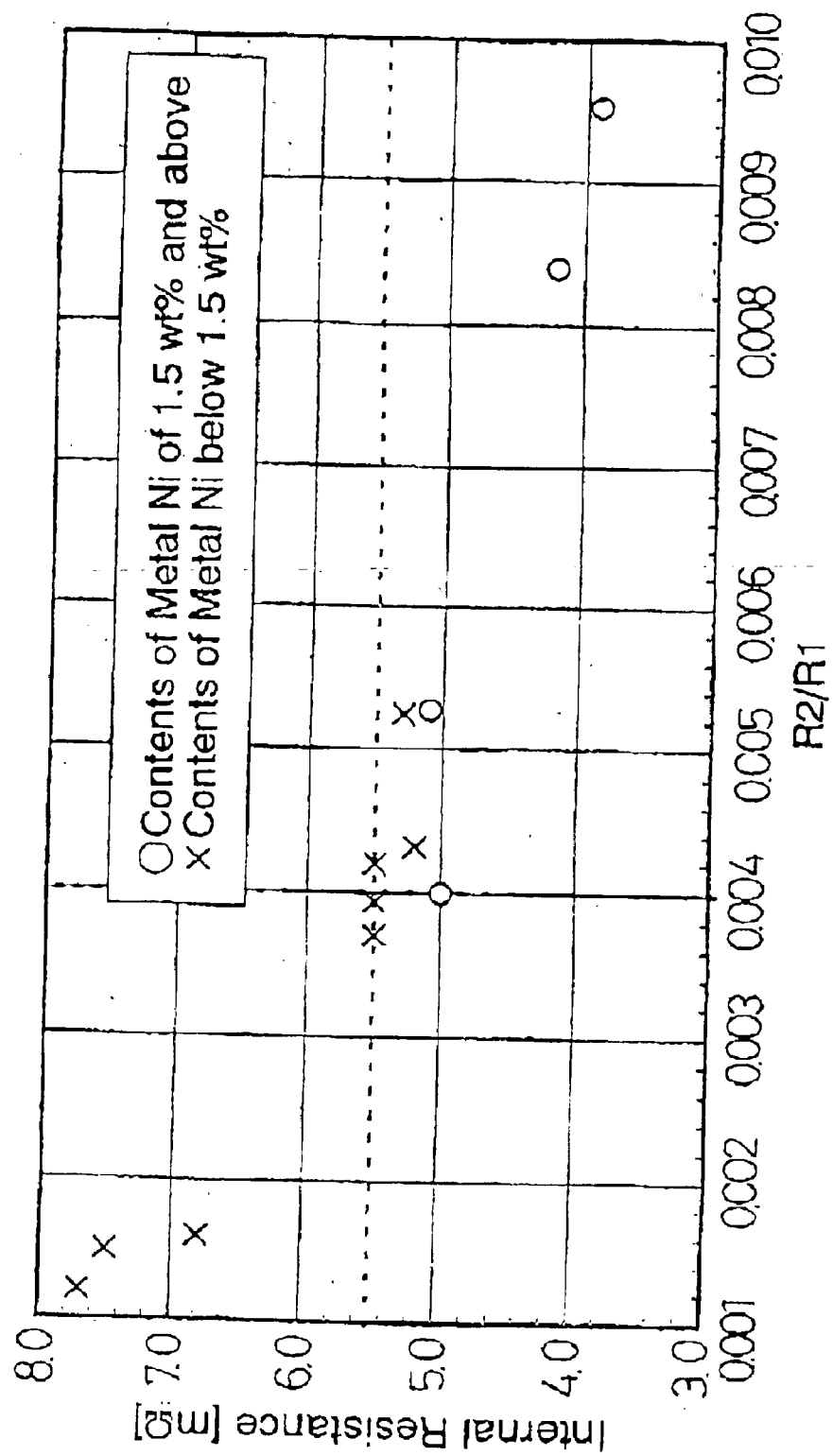
FIG. 6 is a graph showing the correlation among R2/R1, the surface content of metal Ni, and the internal resistance of the hydrogen absorption alloy electrodes according to the embodiment.

FIG. 6 shows the correlation to the internal resistance with R2/R1 and the surface content of metal Ni in the alloy as parameters. Where R2/R1$\geq$0.004 and the surface content of metal Ni reaches or exceeds 1.5% by weight, the internal resistance is stably reduced to or below 5.5 m$\Omega$.

Figure 7:
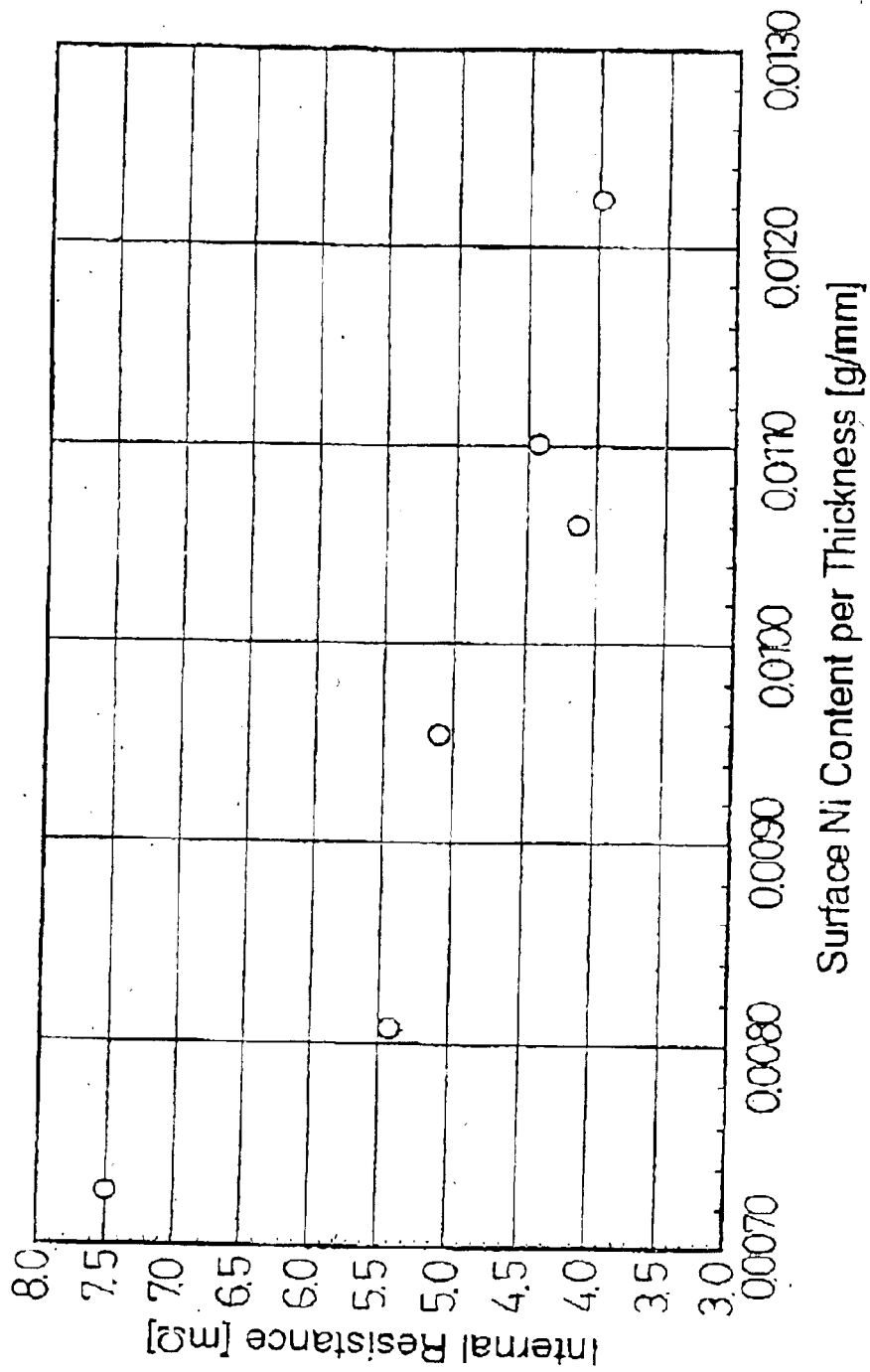
FIG. 7 is a graph showing the correlation between the surface content of metal Ni per thickness and the internal resistance of the hydrogen absorption alloy electrodes according to the embodiment.

FIG. 7 shows the correlation between the surface content of metal Ni (g/mm) per 1-mm-thick alloy portion in a 1-$cm^2$ area of negative electrode and the internal resistance. The internal resistance increases sharply when the amount of pressing is smaller and the surface content of metal Ni per thickness of 1 mm falls below 0.008 g/mm. At and above 0.008 g/mm, the internal resistance is controlled to 5.5 m$\Omega$ or below.

The misch metal preferably is an intermetallic compound having a stoichiometric ratio generally represented as LaNi$_5$, wherein part of La is replaced with Ce, Pr, Nd, and/or other rare-earth elements and part of Ni is replaced with such metals as Co, Mn, and Al.

The method of manufacturing the hydrogen absorption alloy ingots is not limited to particular one. In view of low manufacturing costs, the manufacturing method of melting and casting metals into molds is preferable. Other methods such as quenching can also be used, however, even with equivalent or greater effect.

The alloy obtained may be mechanically wet-ground in water or in an aqueous solution by using an attritor or the like. The wet grinding suppresses local oxidation on the alloy surfaces than with the dry. This facilitates conducting subsequent treatments more uniformly.

Aside from KOH, the surface modification may use such alkali metal hydroxides as NaOH, with a preferable range of concentrations of 10–60% by weight. During the treatments, the solution temperature preferably falls within the range of 60–140° C., and the immersion period 0.5–5 hours.

According to the hydrogen absorption alloy electrode of the present invention, the alloy particles are confined to smaller particle sizes with an increase in the total surface area. Besides, the surface layers, containing large amounts of Ni metal, are given a greater relative thickness. The surface content of Ni metal thus increases sufficiently. This allows a reduction in the initial activation time necessary to lower the internal resistance to operable values, thereby improving productivity.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A hydrogen absorption alloy electrode comprising: hydrogen absorption alloy particles each having a surface layer, wherein said alloy particles satisfy R2/R1$\geq$0.004 and 5 $\mu$m$\leq$R1$\leq$20 $\mu$m, where R1 is a half of a median diameter of said alloy particles and R2 is thickness of said surface layers, wherein said alloy particles are greater than or equal to 0.5 $m^2/g$ in specific surface area.

2. A hydrogen absorption alloy electrode, reaching or exceeding 0.28 $m^2$ in the surface area per electrode area of 1 $cm^2$×thickness of 1 mm, comprising: hydrogen absorption alloy particles each having a surface layer, wherein said alloy particles satisfy R2/R1$\geq$0.004 and 5 $\mu$m$\leq$R1$\leq$20 $\mu$m, where R1 is a half of a median diameter of said alloy particles and R2 is thickness of said surface layers.

3. A hydrogen absorption alloy electrode comprising: hydrogen absorption alloy particles each having a surface layer, wherein said alloy particles satisfy R2/R1$\geq$0.004 and 5 $\mu$m$\leq$R1$\leq$20 $\mu$m, where R1 is a half of a median diameter of said alloy particles and R2 is thickness of said surface layers, wherein said surface layers of said alloy particles are greater than or equal to 8×10$^{-3}$ g in the content of metal Ni per electrode area of 1 $cm^2$×thickness of 1 mm.

* * * * *